Aug. 22, 1944.  C. H. HOOK  2,356,669
REVERSIBLE TAP HOLDER
Filed Sept. 16, 1943   2 Sheets-Sheet 1
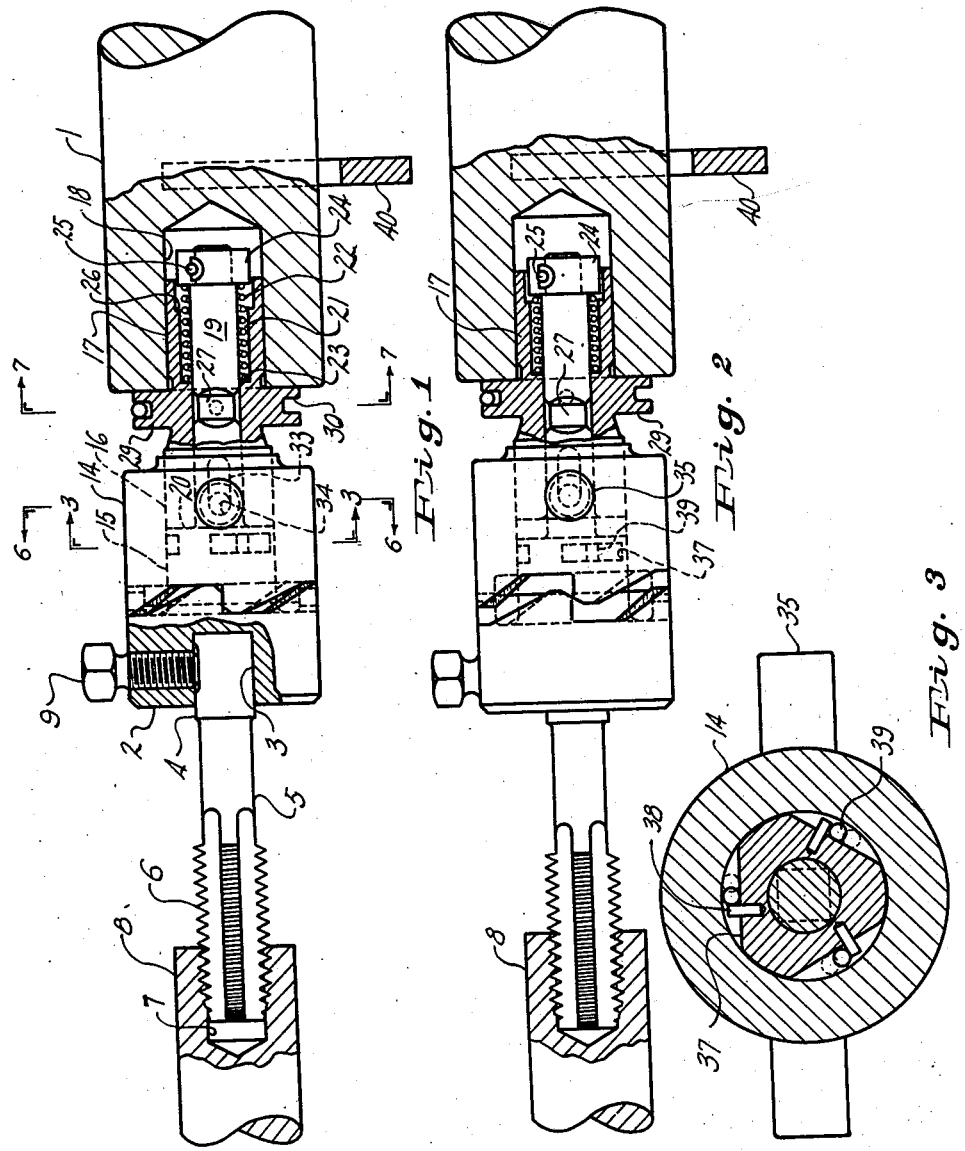
INVENTOR.
Charles Howard Hook
BY William B Jaspert
ATTORNEYS.

Aug. 22, 1944.                C. H. HOOK                 2,356,669
                        REVERSIBLE TAP HOLDER
                       Filed Sept. 16, 1943            2 Sheets-Sheet 2
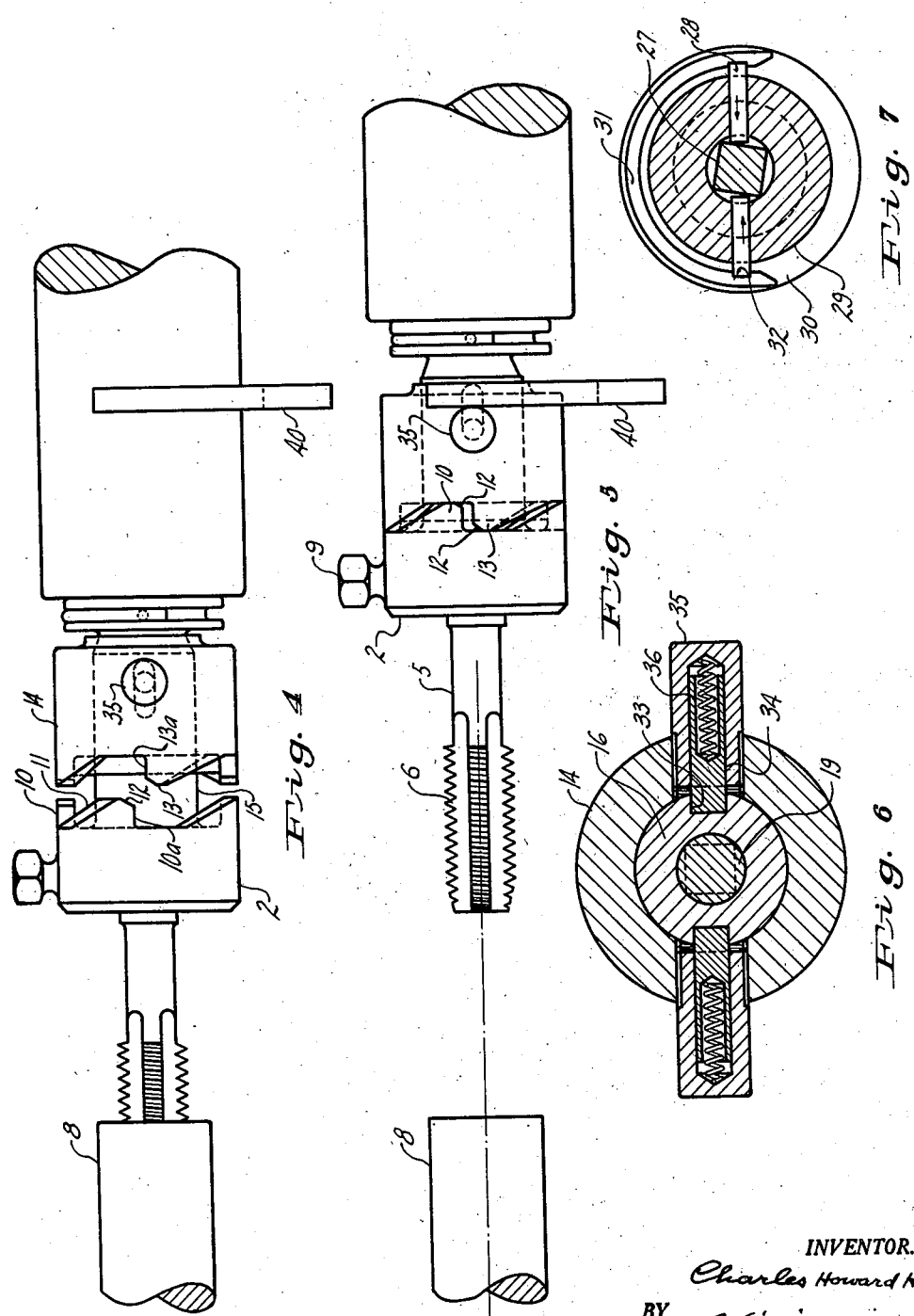
INVENTOR.
Charles Howard Hook
BY William B Jaspert
ATTORNEYS.

Patented Aug. 22, 1944

2,356,669

UNITED STATES PATENT OFFICE 2,356,669

REVERSIBLE TAP HOLDER

Charles Howard Hook, Pittsburgh, Pa.

Application September 16, 1943, Serial No. 502,623

7 Claims. (Cl. 10—136)

This invention relates to reversible tap holders, and it is among the objects thereof to provide a tap holder especially for use in automatic machinery which shall eliminate shock of impact of the tap with the work and of the holder with the tap.

It is a further object of this invention to provide a tap holder which is in interlocking engagement with a stationary spindle during the tapping operation, and freely rotatable when the tap is seated without the tap holder making contact with the interlocking parts.

It is a further object of the invention to provide a tap holder and a shank therefor with an axially movable clutch sleeve mounted on the shank for engagement with the holder, and means for forcibly separating said clutch sleeve from the holder at the time of seating of the tap.

These and other objects of the invention will become more apparent from a consideration of the accompanying drawings constituting a part hereof in which like reference characters designate like parts and in which:

Fig. 1 is a side elevational view partially in section of a tap holder embodying the principles of this invention;

Fig. 2 is a similar view showing an advanced position of the tap in relation to the work;

Fig. 3 a cross-sectional view taken along the line 3—3, Fig. 1;

Fig. 4 a side elevational view of a top holder with the tap moving out of the work;

Fig. 5 a similar view with the tap holder restored to its normal position;

Fig. 6 a cross-section taken along the line 6—6, Fig. 1; and

Fig. 7 a cross-sectional view taken along the line 7—7, Fig. 1.

With reference to the several figures of the drawings, the numeral 1 designates a spindle fixed against rotation, movable axially between fixed limit stops (not shown). The numeral 2 designates a tap holder having a central bore 3 for receiving the head 4 of a tap shank 5, the tap body 6 being partially threaded into the bore 7 of a piece of work 8 to be tapped. The tap is secured in the holder by a set screw 9.

As is more clearly shown in Fig. 4, the tap holder is provided with clutch teeth 10 having inclined faces 11 and 12 which interact with similarly shaped teeth 13 of a clutch sleeve 14 that is rotatably mounted on a shoulder 15 of the tap holder and on a journal 16 of a shank sleeve 17 that fits in the bore 18 of the spindle 1.

As shown by dotted lines in Figs. 1 and 2 the tap holder is provided with a shank 19 which is a straight cylindrical member terminating at 20 in shoulder 15. Shank 19 fits in a cylindrical bore of the hollow shank 17 which is counterbored as shown at 21 to receive a coil spring 22 that abuts against shoulder 23 and the retaining collar 24 which is locked by a pin 25 on shank 19. This construction permits tap holder 2 a limited degree of axial movement until the collar 24 strikes a shoulder 26 of the shank sleeve 17. The teeth 10 of the tap holder and the teeth 13 of clutch sleeve 14 are maintained in alignment by the following means.

The shank 19 of the tap holder is provided with a square portion 27, Fig. 7, which is constantly engaged by pins 28 that are freely slidable in the shoulder 29, Figs. 1 and 7 of the socket 17, the shoulder being provided with a groove 30 in which is nested a semi-circular spring 31, the free ends of which are notched at 32 to engage the pins 28 and bias them radially inward against the squared faces 27 of the shank 19, thereby maintaining the shank in a fixed position relative to the clutch sleeve 14 for a purpose to be hereinafter explained.

Clutch sleeve 14 is slidable partly on the shoulder 15 of the tap holder and partly on the cylindrical end 16 of the shank member 17. The clutch sleeve 14 is maintained in a fixed position relative to the shank member 17 by means of the mechanism shown in Fig. 6 which shows the member 16 as provided with slots 33 shown in dotted lines in Fig. 1 for receiving plungers 34 which are disposed in trunnions 35 secured to the clutch sleeve 14. Coil springs 36 are disposed in the trunnions to bias plungers 34 against the member 16 which serves to permit sliding action of the clutch sleeve 14 within the limits of the slots 33 while the spring member 36 yieldingly holds the clutch sleeve against the member 16 to prevent loose sliding or shattering motion. The trunnions 35 also serve the purpose of restoring the clutch sleeve 14 to its normal position at the end of the tapping operation as will be hereinafter explained.

The clutch sleeve 14 under certain operating conditions interlocks with the tap holder 2 by means of the mechanism shown in Fig. 3 of the drawings. The shoulder 15 of the tap holder is shown with tangent slots 37, having stop pins 38 fitted therein to constitute abutments for rollers 39, which are movable within the space between the abutting pins 38 and the inner periphery of clutch sleeve 14.

Upon relative motion of the clutch sleeve 14 with the tap holder body portion 15, there is no engagement of the rollers 39 with the clutch sleeve, as for example if the chuck holder rotates in a clockwise direction as viewed in Fig. 3. In the opposite direction of rotation of the tap holder, rollers 39 will be wedged between the bottom faces of slots 37 and the inner periphery of the clutch sleeve 14 to hold the tap holder against rotative movement.

The operation of the above described tap holder is briefly as follows.

Figs. 1, 2, 4 and 5 illustrate the operating steps in their proper sequence. Spindle 1 which is a non-rotating spindle is set for movement axially in the direction of the work-piece 8 up to the point where the tap threads 6 are within the distance from the bottom of the drill hole 7 corresponding to the depth of the clutch teeth 10 and 13. The threads of the tap being right-handed, the work-piece 8 is rotated in a clockwise direction as viewed from the back of the work-piece, and when the spindle 1 has travelled to the stop, which is in the position shown in Fig. 1, further rotation of the work-piece 8 will cause the tap to continue its travel into the drill hole until it is seated as shown in Fig. 2. As it travels forward when the spindle 1 has stopped, the clutch teeth 10 and 13 will separate as shown in Fig. 2, and when the tap has bottomed, as shown in Fig. 2, further rotation of the work-piece 8 will cause the clutch teeth 10 of the tap holder 2 to displace the teeth 13 of the clutch sleeve 14.

By virtue of the inclined faces 12 of the clutch teeth, this displacement action will take place and the force of separation will cause clutch sleeve 14 to be impulsively displaced in an axial direction within the limits of the slot 33, the spring member 36, Fig. 6, holding the clutch sleeve in its displaced position.

As the tap moves to separate the clutch teeth, the entire tap holder moves in the direction of the work, including the tap holder shank 19 which compresses the coil spring 22 and the square portion 27 of the shank 19 will become disengaged from the pins or plungers 28, leaving the tap holder and its shank free to rotate with the work 8.

While this tapping operation takes place, the machine may be performing other operations which, when completed, cause a reversal of the direction of rotation of the work-piece 8, which takes the tap with it in a counter-clockwise direction.

Immediately upon reversal, rollers 39, Fig. 3, become wedged with the clutch sleeve 14, which is held against rotation by plungers 34, Fig. 6, thereby holding the tap holder against rotation and causing the tap to travel out of the work-piece as shown in Fig. 4.

When the tap has cleared the last thread and the tap holder is free, spring 22 will draw it to the position shown in Fig. 1, bringing the square faces 27 in alignment with plungers 28, which rotate the tap holder until the squares are parallel with the end faces of the plungers 28. In this position, clutch teeth 10 are in alignment with the clutch teeth 13 of the clutch sleeve 14, although they are still separated because the clutch sleeve has been axially displaced, as previously explained.

Spindle 1 then moves axially away from the work, as shown in Fig. 1, to the starting position, and while so moving the trunnions 35 of the clutch sleeve 14 engage a fixed stop 40 adjacent the spindle 1 which constitutes an abutment preventing further movement of sleeve 14 while the spindle travels rearward a sufficient distance to push clutch sleeve 14 into engagement with the tap holder as shown in Fig. 5.

Upon the resetting movement of the clutch sleeve 14, the inclined faces 11 of the clutch teeth will bring them into engagement so that the clutch faces 10a and 13a will engage as shown in Fig. 1.

The tap holder is then set to begin a tapping operation by forward movement of spindle 1 in the direction of the work-piece 8. One of the features distinguishing the tap holder from the conventional types now in use is the separately movable clutch sleeve element 14 which in the prior art is an integral part of the shank element 17. Because of this independent movement, the clutch teeth of the tap holder 2 act as a knife switch to displace the clutch sleeve 14 and clear it so that there can be no engagement between the clutch teeth of the tap holder and the sleeve 14 while the tap holder is rotating freely after completion of the tapping operation.

In conventional reversible type holders, the clutch teeth engaged while the tap holder was rotating, which transmitted a jarring impact force to the threads of the tap, causing frequent breakage. It also resulted in rapid wear of the teeth of the tap holder, which greatly shortened the life of these tap holders which are relatively expensive.

By means of the above-described tap holder, there is no contact of the clutch teeth during the rotating movement of the tap holder, and consequently no wear. By means of the self-aligning square and plunger members 27 and 28, respectively, and by the constant alignment of the clutch sleeve 14 through the plunger 34, the clutch teeth are restored to normal engaging contact at the completion of the tapping operation so that there can be no clashing or jarring of either the tap holder members or the tap, which would result in wear and breakage.

It is evident from the foregoing description of the invention that reversible tap holders made in accordance therewith provide a practically indestructible device which protects the taps from breakage and eliminates defective threads which would result from wear in the tap holder members.

Although one embodiment of the invention has been herein illustrated and described, it will be evident to those skilled in the art that various modifications may be made in the details of construction without departing from the principles herein set forth.

I claim:

1. A reversible tap holder comprising a spindle having a head for receiving the tap and having clutch teeth thereon, a shank for mounting said spindle, and a clutch sleeve mounted on said shank for engaging the teeth of the spindle head, said sleeve being slidably mounted for axial movement on said shank, and said clutch teeth having trail-off edges which when engaged forcibly separates the clutch sleeve to release said tap holder for rotary movement.

2. A reversible tap holder comprising a spindle having a head for receiving the tap and having clutch teeth thereon, a shank for mounting said spindle, and a clutch sleeve mounted on said shank for engaging the teeth of the spindle head, said sleeve being slidably mounted for axial movement on said shank, and said clutch teeth having inclined surfaces on their driving faces which when contacting at the point of separation of the clutch teeth will displace the clutch sleeve to release said tap head for rotary movement.

3. A reversible tap holder comprising a spindle having a head for receiving the tap and having clutch teeth thereon, a shank for mounting said spindle, and a clutch sleeve mounted on said shank for engaging the teeth of the spindle head, said sleeve being slidably mounted for axial movement on said shank, and said spindle being adapted for axial movement in said shank a distance corresponding to the length of the engaging faces of the clutch teeth, the clutch teeth being inclined at ends of their driving surfaces to effect axial displacement of the clutch sleeve out of contact with the spindle head at the end of the tapping operation.

4. A reversible tap holder comprising a spindle having a head for receiving the tap and having clutch teeth thereon, a shank for mounting said spindle, and a clutch sleeve mounted on said shank for engaging the teeth of the spindle head, said spindle having tangential slots, rollers in said slots for engaging the inner periphery of said clutch sleeve in one direction of rotation of the spindle, said clutch sleeve being provided with trunnions slidably mounted in key slots in said shank and having spring means for yieldingly holding the trunnions in engagement with the key slots of the spindle shank, said trunnions extending radially outward of the clutch sleeve for engaging a stationary member to return the clutch sleeve to clutching engagement with the spindle head.

5. A reversible tap holder comprising a spindle having a head and having clutch teeth thereon, a shank for mounting said spindle and a clutch sleeve mounted on said shank for engaging the teeth of the spindle head, said spindle having tangent faces and said shank having spring biased plungers for engaging said faces, the faces of the spindle being angularly spaced relative to the clutch teeth of the spindle to maintain pre-alignment of the clutch teeth with the spindle shank, and said clutch sleeve being mounted for sliding movement on the spindle shank and locked against rotary movement thereon, whereby the clutch teeth of the spindle and clutch sleeve are maintained in operative alignment to maintain contact of the clutch tooth faces to prevent impact thereon when the tap is brought in cutting engagement with the work.

6. In combination with a shank for mounting on a non-rotating spindle of a tap holder having a socket end for receiving the tap and having a spindle journalled in said shank and a clutch sleeve slidably mounted on said tap holder and shank, said tap holder having teeth for engagement by the teeth of said clutch sleeve to restrain the holder against rotation in one direction, and said holder and sleeve having wedge elements interposed therebetween for locking the tap holder against rotation in the opposite direction, said tap holder being axially movable in the shank a distance corresponding to the depth of the clutch teeth, and said clutch teeth having inclined ends at their driving surfaces to displace the clutch sleeve axially out of contact with the teeth of the holder when the holder has travelled axially the limit of its movement in the shank.

7. A reversible tap holder having a socket head for receiving a tap and having clutch teeth on the opposite face thereof, said holder having a shoulder extending rearward from said teeth terminating in a spindle, a socket shank for said spindle for mounting on a carriage, said shank having a counterbore for a coil spring and said spindle having a collar constituting an abutment for said spring, and said shank having a shoulder of the same diameter as the shoulder of said tap holder, a clutch sleeve slidably mounted on the shoulders of said tap holder and shank having teeth coacting with the teeth of the tap holder, means independently of the clutch teeth for locking said tap holder and sleeve in one direction of rotation of said holder, means for maintaining clutching alignment of the tap holder clutch teeth with the clutch teeth of said sleeve, means for locking said sleeve against rotary movement while permitting limited axial movement, the clutch engaging faces having inclined ends for effecting axial displacement of the sleeve when the teeth contact on said ends, and means for returning said sleeve to clutch engaging position upon completion of the tapping operation.

CHARLES HOWARD HOOK.